(12) United States Patent
Yang et al.

(10) Patent No.: US 6,791,375 B2
(45) Date of Patent: Sep. 14, 2004

(54) METHOD AND CIRCUIT FOR SWITCHING SOURCE MODULATION FREQUENCY

(75) Inventors: Pei Pei Yang, Hsinchu (TW); Darchemg Su, Taipei (TW); Ko-Chin Wang, Hsinchu (TW)

(73) Assignee: Winbond Electronics Corporation, Hsinchu (TW)

( * ) Notice: Subject to any disclaimer, the term of this patent is extended or adjusted under 35 U.S.C. 154(b) by 54 days.

(21) Appl. No.: 10/271,348

(22) Filed: Oct. 15, 2002

(65) Prior Publication Data

US 2003/0072170 A1 Apr. 17, 2003

(30) Foreign Application Priority Data

Oct. 15, 2001 (TW) .......................................... 90125461 A

(51) Int. Cl.$^7$ ................................................ H03L 7/00
(52) U.S. Cl. .......................... 327/99; 327/407; 713/323
(58) Field of Search ............. 327/99, 407; 713/320–340

(56) References Cited

U.S. PATENT DOCUMENTS

| | | | | |
|---|---|---|---|---|
| 5,155,840 A | * | 10/1992 | Niijima | 713/400 |
| 5,274,678 A | * | 12/1993 | Ferolito et al. | 375/357 |
| 5,623,234 A | * | 4/1997 | Shaik et al. | 331/49 |
| 6,009,319 A | * | 12/1999 | Khullar et al. | 340/7.38 |
| 6,629,256 B1 | * | 9/2003 | Ilan et al. | 713/501 |
| 2002/0026596 A1 | * | 2/2002 | Kim | 713/322 |

* cited by examiner

*Primary Examiner*—Minh Nguyen
(74) *Attorney, Agent, or Firm*—Knoble Yoshida & Dunleavy, LLC

(57) ABSTRACT

The DC to DC converter has an oscillator and generates an output voltage to drive a system. The modulation frequency is used for modulating a pulse width modulation (PWM) circuit in the DC to DC converter. The method includes steps of: 1. providing the modulation frequency from the oscillator; 2. switching the source of the modulation frequency from the oscillator to the system clock to provide the modulation frequency when the system is driven by the output voltage from the DC to DC converter; and 3. stopping the oscillator for reducing a power loss.

20 Claims, 4 Drawing Sheets

METHOD AND CIRCUIT FOR SWITCHING SOURCE MODULATION FREQUENCY

FIELD OF THE INVENTION

The present invention is related to a method and a circuit for switching a source of a modulation frequency, and more particularly for switching a source of a modulation frequency used in a direct current to direct current (DC to DC) converter.

BACKGROUND OF THE INVENTION

The traditional DC to DC converter is applied to adjust the voltage level of the DC input voltage to stabilize the output voltage at a pre-determined value.

Please refer to FIG. 1, which is a block diagram showing the circuit configuration of the prior art of the present invention. This circuit configuration is used to offer a constant frequency from a resistance-capacitance oscillator (RCO) 10 to a pulse width modulation (PWM) circuit 11 to engage in the modulation. Thus, a switching frequency signal $F_p$ is generated to control a controllable switch 12 which is made of an n-type metal-oxide-semiconductor transistor (NMOS) to maintain the output voltage at a certain value.

The method to control the switching frequency signal $F_p$ is as follows:

1. When $F_p$ is at the high level, the controllable switch 12 is conducted. Through the inductor L, the input current $I_L$ flows through NMOS, then $I_L$ is grounded. Thus, the diode D is reverse-biased, and an output current is offered by the capacitor C onto the load $R_L$.

2. When $F_p$ is at the low level, the controllable switch 12 is closed. The inductor L will change the direction of the magnetic field thus making the positive pole and negative pole of the inductor to switch. This will cause the diode D to be forward-biased, and make the energy store in the inductor to produce an output current. Through the diode D, the output current is offered onto the load $R_L$.

When the output voltage of the direct current to direct current (DC to DC) converter is stabilized at a pre-determined voltage, it will drive a system to begin the normal operation. Since the resistance-capacitance oscillator 10 will keep on offering a certain frequency to the pulse width modulation circuit 11 after the system is operated normally, therefore, the operation of the resistance-capacitance oscillator 10 will increase the power consumption of the whole system.

Keeping the drawbacks of the prior art in mind, and employing the experiments and research full-heartily and persistently, the applicants finally conceived the method and circuit for switching source of modulation.

SUMMARY OF THE INVENTION

It is therefore an object of the present invention to propose a method for switching a source of a modulation frequency used in a direct current to direct current (DC to DC) converter.

It is therefore another object of the present invention to propose a circuit for switching a source of a modulation frequency used in a direct current to direct current (DC to DC) converter.

According to the aspect of the present invention, the DC to DC converter has an oscillator and generates an output voltage to drive a system. The modulation frequency is used for modulating a pulse width modulation (PWM) circuit in the DC to DC converter. The method includes steps of:

1. providing the modulation frequency from the oscillator;
2. switching the source of the modulation frequency from the oscillator to a system clock to provide the modulation frequency when the system is driven by the output voltage from the DC to DC converter; and
3. stopping the oscillator for reducing a power loss.

Certainly, the oscillator can be a resistance-capacitance oscillator (RCO).

Certainly, the system can be a wireless communication system.

Preferably, the system clock is generated by a clock generator.

Preferably, the clock generator is mounted in the interior of the system.

Preferably, the step of switching the source of the modulation frequency is performed by a multiplexer.

Preferably, the multiplexer switches the source of the modulation frequency from the oscillator to the system clock in response to a system stabilized signal from the system, and then stops the oscillator.

Preferably, the method further includes the step of increasing an oscillating frequency of the oscillator, so as to increase the level of the output voltage rapidly when the output voltage is under a reference voltage to drive the system.

Preferably, the method further includes the step of reducing the oscillating frequency of the oscillator in order to reduce the power loss generated by the oscillator when the output voltage is over the reference voltage.

Preferably, the reference voltage is predetermined by users.

Preferably, the modulation frequency is a constant frequency.

According to the aspect of the present invention, the DC to DC converter generates an output voltage to drive a system. The modulation frequency is used for modulating a pulse width modulation (PWM) circuit in the DC to DC converter. The circuit for switching a source of a modulation frequency includes an oscillator for providing the modulation frequency, a clock generator providing the modulation frequency, and a first multiplexer electrically connected between the oscillator and the clock generator. The first multiplexer allows the oscillator to provide the modulation frequency before the output voltage is used to drive the system. The source of the modulation frequency is switched from the oscillator to the clock generator by the first multiplexer according to a system stabilized signal generated from the system after the system is driven by the output voltage.

Certainly, the oscillator can be a resistance-capacitance oscillator (RCO).

Certainly, the system can be a wireless communication system.

Preferably, the clock generator generates a system clock to provide the modulation frequency.

Preferably, the system stabilized signal is used to stop the oscillator.

Preferably, the oscillator further includes a second multiplexer mounted therein.

Preferably, the second multiplexer is used for selecting an oscillating frequency of the oscillator in response to an output signal of a comparative circuit.

Preferably, the comparative circuit is used for providing the comparison between the output voltage and a reference voltage in order to generate the output signal.

Preferably, the reference voltage is predetermined by users.

Preferably, the modulation frequency is a constant frequency.

DETAILED DESCRIPTION OF THE PREFERRED EMBODIMENT

Figure 1:
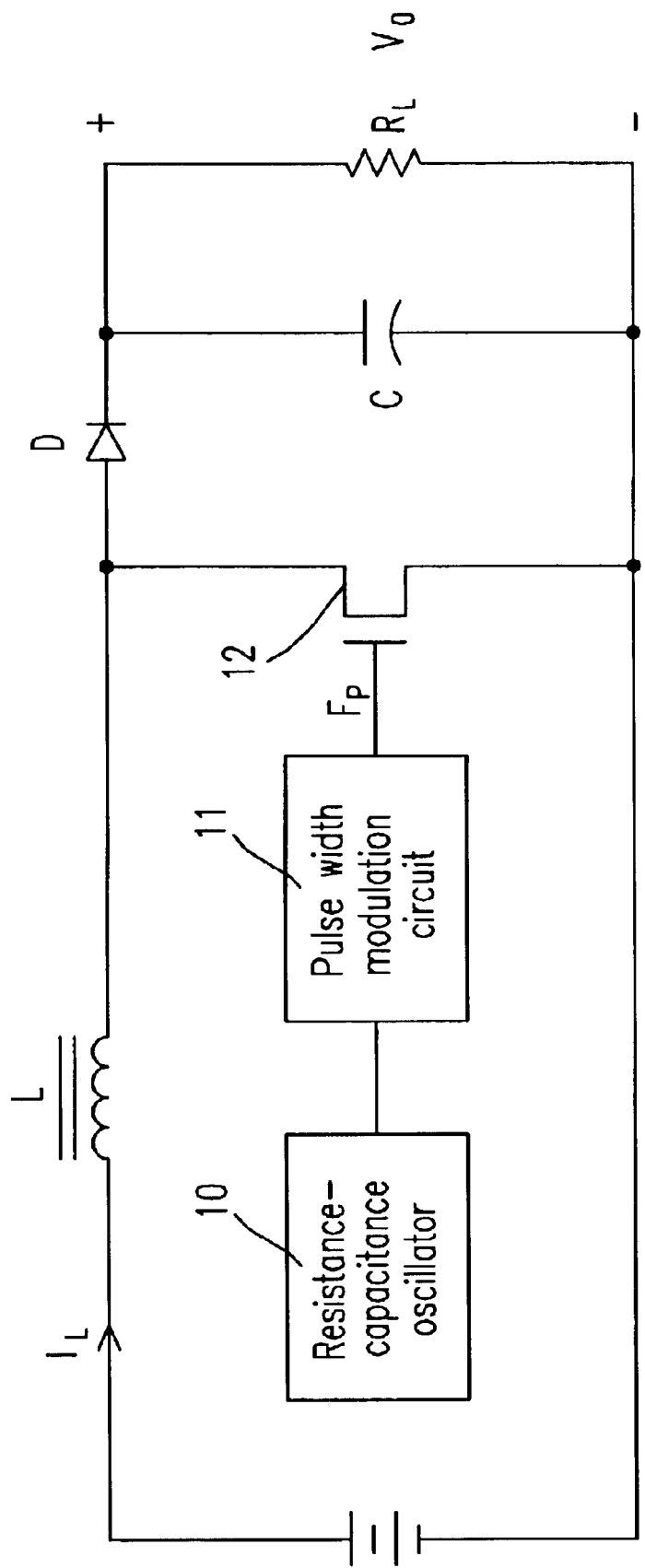
FIG. 1 is a block diagram showing the circuit configuration of the prior art of the present invention.
Figure 2:
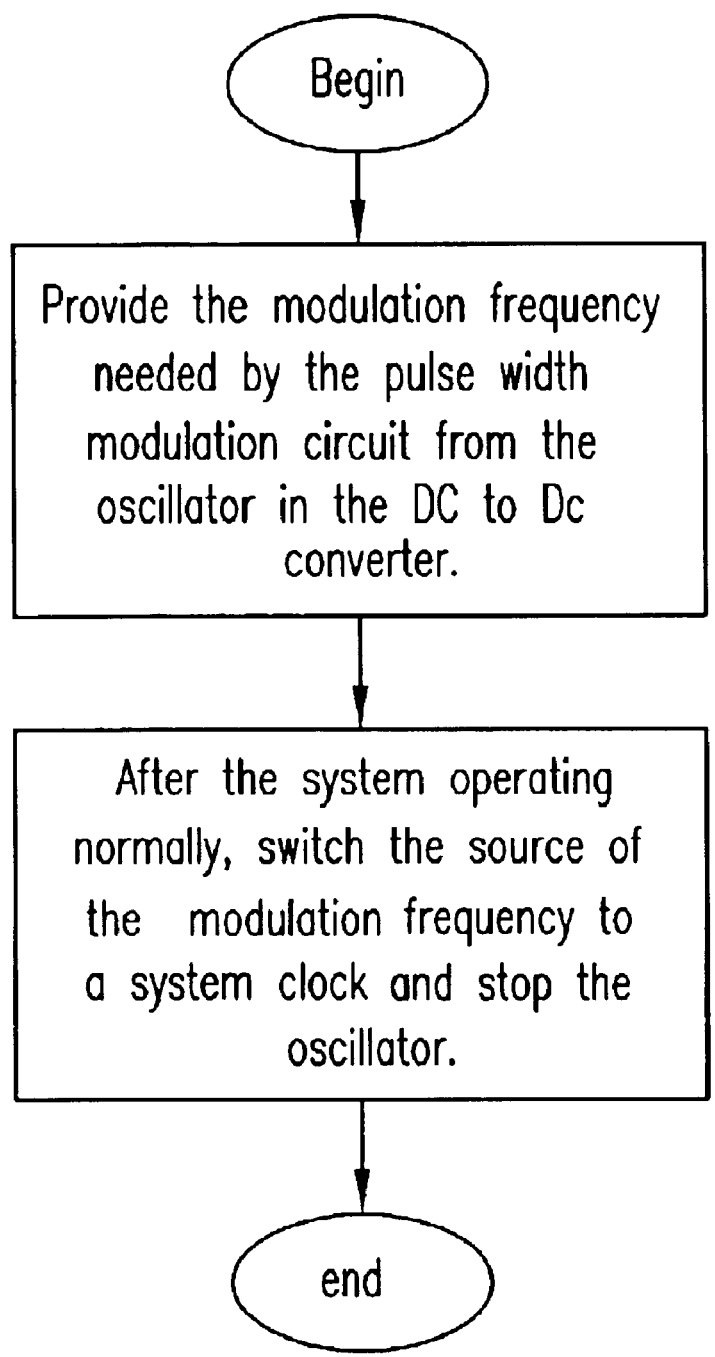
FIG. 2 is a flow chart showing the method for switching the source of the modulation frequency of the present invention.

Please refer to FIG. 2, which is a flow chart showing the method for switching the source of the modulation frequency of the present invention. This method is primarily applied to the DC to DC converter. The DC to DC converter generates an output voltage which is offered as the needed voltage to drive a system operating in the normal condition. The modulation frequency is needed for modulating the pulse width modulation (PWM) circuit in the DC to DC converter. This method includes steps of:

1. providing the modulation frequency from the resistance-capacitance oscillator in the DC to DC converter when the output voltage of the DC to DC converter can not drive the system to operate normally;
2. switching the source of the modulation frequency from the oscillator to a system clock to provide the modulation frequency when the system is driven by the output voltage from the DC to DC converter to operate normally; and
3. stopping the oscillator for reducing the power loss.

This method further includes the steps of:

1. increasing the oscillating frequency of the oscillator before the system is operating normally, so as to increase the level of the output voltage rapidly when the output voltage is under a pre-determined reference voltage setting by the user to drive the system; and
2. lowering the oscillating frequency of the oscillator when the output voltage is above the reference voltage for reducing the power loss.

Figure 3:
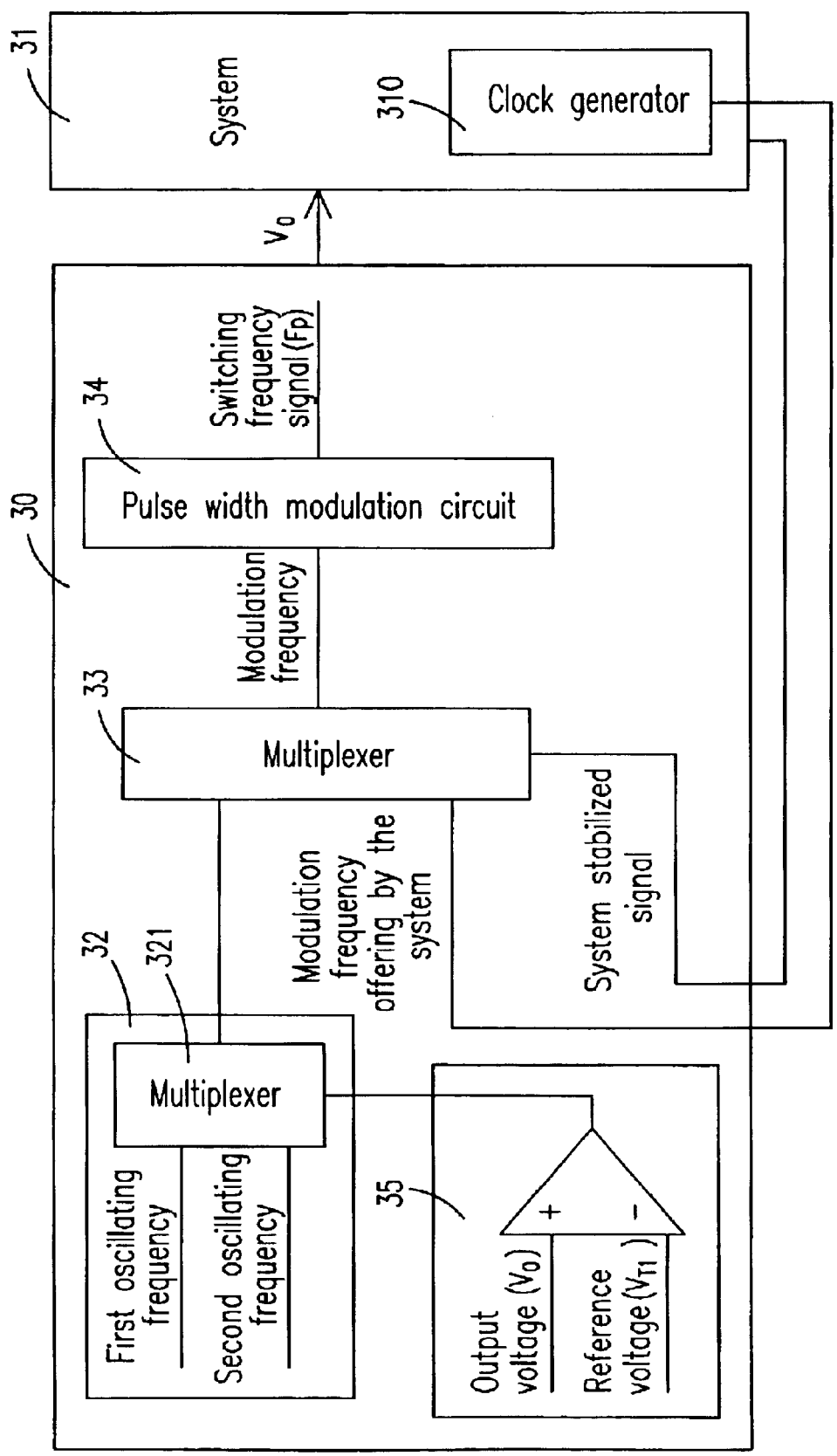
FIG. 3 is a block diagram showing the circuit configuration for switching the source of the modulation frequency of the present invention.

Please refer to FIG. 3, which is a block diagram showing the circuit configuration for switching the source of the modulation frequency of the present invention. This circuit includes the resistance-capacitance oscillator 32, the clock generator 310, the pulse width modulation circuit 34, and the comparative circuit 35. The resistance-capacitance oscillator 32 is mounted in the DC to DC converter 30 and is used to offer the modulation frequency needed by the pulse width modulation circuit 34. The clock generator 310 is mounted in the system 31 and generates a system clock to offer the modulation frequency needed by the pulse width modulation circuit 34. The multiplexer is mounted in the DC to DC converter and is electrically connected between the resistance-capacitance oscillator 32 and the clock generator 310. The multiplexer allows the resistance-capacitance oscillator 32 to provide the modulation frequency before the system 31 is operated normally. The source of the modulation frequency is switching to the clock generator 310 controlling by a system stabilized signal generated from the system 31 after the system 31 is operated normally. The system stabilized signal is also used to stop the resistance-capacitance oscillator 32 for reducing the power loss. Preferably, the system is a wireless communication system and the modulation frequency is a constant frequency.

Please refer to FIG. 3, the resistance-capacitance oscillator 32 includes a multiplexer 321 to control the output signal generating by the comparative circuit 35. Through controlling an output signal after comparing the output voltage $V_O$ and a reference voltage $V_{T1}$, the oscillating frequency of the resistance-capacitance oscillator 32 is chosen to generate the modulation frequency.

Figure 4:
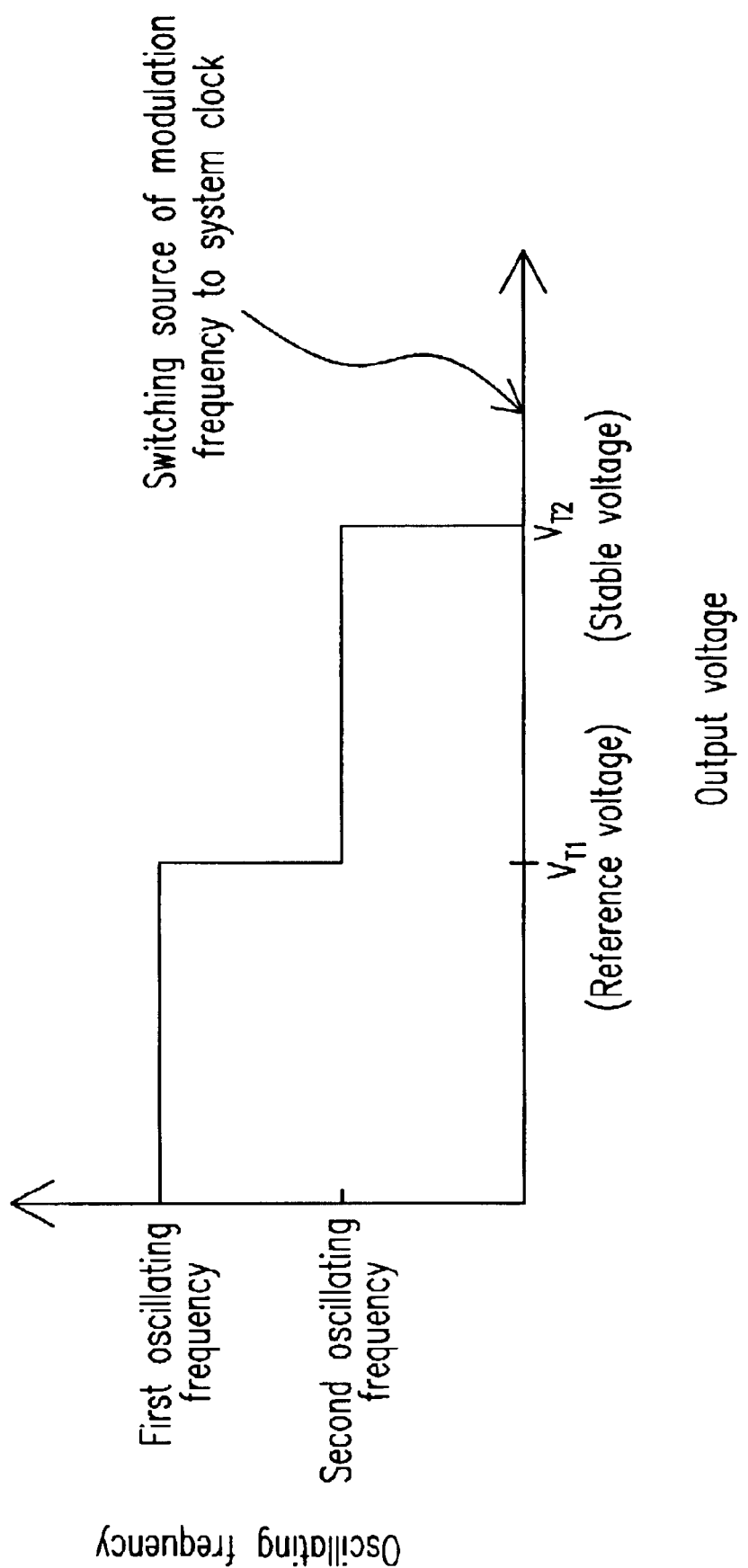
FIG. 4 is a plot showing the relationship between the output voltage and the oscillating frequency of the oscillator of the present invention.

Please refer to FIG. 4, which is a plot showing the relationship between the output voltage and the oscillating frequency of the oscillator of the present invention. According to the plot, when the output voltage is under a predetermined reference voltage $V_{T1}$, the multiplexer 321 chooses the first oscillating frequency to increase the level of the output voltage rapidly. Until the output voltage is above the reference voltage $V_{T1}$, then the multiplexer chooses the second oscillating frequency to lower oscillating frequency of the resistance-capacitance oscillator 32 for reducing the power loss. When the output voltage reaches the stable voltage $V_{T2}$ which makes the system operating normally, the source of the modulation frequency to the system clock is switched.

In conclusion, drawbacks of the prior art are overcome. After the system operating normally, switch the source of the modulation frequency to the system and stop the operation of the resistance-capacitance oscillator for reducing the power loss. Thus, the present invention has its value in the industry, and the purpose of developing the present invention is achieved.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A method for selecting a source of a modulation frequency used in a direct current to direct current (DC to DC) converter, wherein said DC to DC converter has an oscillator and generates an output voltage to drive a system and said modulation frequency is used for modulating a pulse width modulation (PWM) circuit in said DC to DC converter, comprising steps of:

providing said modulation frequency from said oscillator;
   switching said source of said modulation frequency from said oscillator to a system clock to provide said modulation frequency when said system is driven by said output voltage from said DC to DC converter; and
   stopping said oscillator for reducing a power loss.

2. The method according to claim 1 wherein said oscillator is a resistance-capacitance oscillator (RCO).

3. The method according to claim 1 wherein said system is a wireless communication system.

4. The method according to claim 1 wherein said system clock is generated by a clock generator.

5. The method according to claim 4 wherein said clock generator is mounted in the interior of said system.

6. The method according to claim 1 wherein the step of switching said source of said modulation frequency is performed by a multiplexer.

7. The method according to claim 6 wherein said multiplexer switches said source of said modulation frequency from said oscillator to said system clock in response to a system stabilized signal from said system and then stops said oscillator.

8. The method according to claim 1 further comprising the step of:

increasing an oscillating frequency of said oscillator so as to increase the level of said output voltage rapidly when said output voltage is under a reference voltage to drive said system; and reducing said oscillating frequency of said oscillator in order to reduce said power loss generated by said oscillator when said output voltage is over said reference voltage.

9. The method according to claim 8 wherein said reference voltage is predetermined by users.

10. The method according to claim 1 wherein said modulation frequency is a constant frequency.

11. A circuit for selecting a source of a modulation frequency used in a direct current to direct current (DC to DC) converter, wherein said DC to DC converter generates an output voltage to drive a system and said modulation frequency is used for modulating a pulse width modulation (PWM) circuit in said DC to DC converter, comprising:

an oscillator for providing said modulation frequency;

a clock generator for providing said modulation frequency; and a first multiplexer electrically connected between said oscillator and said clock generator for allowing said oscillator to provide said modulation frequency before said output voltage is used to drive said system and said source of said modulation frequency is switched from said oscillator to said clock generator by said first multiplexer according to a system stabilized signal generated from said system after said system is driven by said output voltage.

12. The circuit according to claim 11, wherein said oscillator is a resistance-capacitance oscillator (RCO).

13. The circuit according to claim 11 wherein said system is a wireless communication system.

14. The circuit according to claim 11 wherein said clock generator generates a system clock to provide said modulation frequency.

15. The circuit according to claim 11 wherein said system stabilized signal is used to stop said oscillator.

16. The circuit according to claim 11 wherein said oscillator further includes a second multiplexer mounted therein.

17. The circuit according to claim 16 wherein said second multiplexer is used for selecting an oscillating frequency of said oscillator in response to an output signal of a comparative circuit.

18. The circuit according to claim 17 wherein said comparative circuit is used for providing the comparison between said output voltage and a reference voltage in order to generate said output signal.

19. The circuit according to claim 18 wherein said reference voltage is predetermined by users.

20. The circuit according to claim 11 wherein said modulation frequency is a constant frequency.

* * * * *